(12) United States Patent
Zhang et al.

(10) Patent No.: US 9,724,832 B2
(45) Date of Patent: Aug. 8, 2017

(54) ELASTIC CORRUGATED PIPE SINGLE-ACTING CYLINDER-DRIVEN MECHANICAL GRIPPER WITH SERIES-CONNECTION PLATE SPRING FRAMEWORK

(71) Applicant: Jiangnan University, Wuxi (CN)

(72) Inventors: Jun Zhang, Wuxi (CN); Qiuju Zhang, Wuxi (CN); Jianzhong Jiang, Wuxi (CN); Bing Lv, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 15/117,207

(22) PCT Filed: May 12, 2015

(86) PCT No.: PCT/CN2015/078759
§ 371 (c)(1),
(2) Date: Aug. 8, 2016

(87) PCT Pub. No.: WO2016/179793
PCT Pub. Date: Nov. 17, 2016

(65) Prior Publication Data
US 2017/0157780 A1  Jun. 8, 2017

(51) Int. Cl.
*B25J 15/12* (2006.01)
*B25J 15/10* (2006.01)

(52) U.S. Cl.
CPC ............. *B25J 15/12* (2013.01); *B25J 15/103* (2013.01)

(58) Field of Classification Search
CPC ........ B25J 15/0028; B25J 15/02; B25J 15/10; B25J 15/103; B25J 15/12; B25J 11/0045; Y10S 901/37
(Continued)

(56) References Cited

U.S. PATENT DOCUMENTS 2,829,918 A * 4/1958 Stoakes .................. B65B 21/18
294/116
4,452,479 A   6/1984 Terai et al.
(Continued)

FOREIGN PATENT DOCUMENTS

| CN | 104802179 A | 7/2015 |
| CN | 204725506 U | 10/2015 |
| EP | 2135809 A2 | 12/2009 |

*Primary Examiner* — Dean Kramer
(74) *Attorney, Agent, or Firm* — Gokalp Bayramoglu (57) ABSTRACT

The invention relates to an elastic corrugated pipe single-acting cylinder-driven mechanical gripper with a series-connection plate spring framework. The mechanical gripper consists of a palm and two flexible fingers or a palm and three flexible fingers. The flexible fingers are identical in structure. Each flexible finger consists of an elastic corrugated pipe single-acting cylinder and a series-connection plate spring. Dimensions of all plate springs connected in series are optimally designed according to grasping objects. The mechanical gripper is driven by the elastic corrugated pipe single-acting cylinder to generate a grasping force. The mechanical gripper applies to the grasping of fragile, brittle objects or the grasping of objects varying with shapes and dimensions. When connected with a robot body, the mechanical gripper particularly applies to the production and logistic fields for grasping, sorting and packing of foods, agriculture products and light industrial products.

10 Claims, 4 Drawing Sheets

(58) Field of Classification Search
USPC .................................................. 294/196, 99.1
See application file for complete search history.

(56) References Cited

U.S. PATENT DOCUMENTS

| | | | | |
|---|---|---|---|---|
| 5,046,773 A * | 9/1991 | Modesitt | .................... | B25J 7/00 |
| | | | | 294/100 |
| 5,163,804 A * | 11/1992 | Kobayashi | .............. | B66C 1/427 |
| | | | | 294/196 |
| 8,231,158 B2 * | 7/2012 | Dollar | ...................... | B25J 9/104 |
| | | | | 294/106 |
| 8,596,699 B2 * | 12/2013 | Sdahl | ................... | B25J 15/0253 |
| | | | | 294/196 |

* cited by examiner

ELASTIC CORRUGATED PIPE SINGLE-ACTING CYLINDER-DRIVEN MECHANICAL GRIPPER WITH SERIES-CONNECTION PLATE SPRING FRAMEWORK

TECHNICAL FIELD

The present invention relates to an elastic corrugated pipe single-acting cylinder-driven mechanical gripper with a series-connection plate spring framework. The mechanical gripper consists of a palm and two flexible fingers or a palm and three flexible fingers. The flexible fingers are identical in structure. Each flexible finger consists of an elastic corrugated pipe single-acting cylinder and a series-connection plate spring. Dimensions of all plate springs connected in series are optimally designed according to grasping objects. The mechanical gripper is driven by the elastic corrugated pipe single-acting cylinder to generate a grasping force. The mechanical gripper applies to the grasping of fragile, brittle objects or the grasping of objects varying with shapes and dimensions, belonging to the application technology field of robots and mechatronics. When connected with a robot body, the mechanical gripper particularly applies to the production and logistic fields for grasping, sorting and packing of foods, agriculture products and light industrial products.

BACKGROUND

In view of the current mass production situations of the light industry and food industry, a logistical grasping mechanical gripper is needed to meet the logistics and packing demands of irregularly shaped and diversified raw materials, semi-finished products and finished products and to solve the problems of high cost and poor operation conditions of single labor manual operation. Various complicated objects to be grasped are classified into the following types: (1) flexible objects tending to change in shape (bread, objects in flexible packaging); (2) fragile, brittle objects (bird eggs, glass and ceramic products); (3) irregularly shaped objects greatly varying in dimensions (fruits and vegetables); (4) irregularly shaped objects which are in chaos at different positions and difficult to sort (wine bottles, cosmetic bottles). From the above mentioned it can be seen that complicated objects greatly vary with material property, shape, dimension and position status. Traditional industrial mechanical grippers are pincer-type or parallel-translation structures, and can only grasp rigid workpieces which are identical in shape and dimensions, keep the same position status, and are not easily broken. A human-simulated manipulator needs to sense the space position and shape of a complicated object and needs precise control over the movement and the grasping force, otherwise, the complicated object will be damaged or cannot be reliably grasped. However, current human-simulated manipulators are under lab research, have high cost and impose high requirements for service environment.

The elastic corrugated pipe single-acting cylinder-driven mechanical gripper with a series-connection plate spring framework of the present invention has the following features: the mechanical gripper has a high degree of flexible freedom and buffering effect on external loads, and therefore has high flexibility self-adaption when grasping complicated objects; meanwhile, the elastic corrugated pipe single-acting cylinder operates smoothly and responds quickly because of not being stressed by the friction forces generated by rubber seals on a cylinder piston and a piston rod.

SUMMARY OF THE INVENTION

The key components of the mechanical gripper of the present invention are flexible fingers, which are also called flexible joints. Before the present invention, a patent application (a pneumatic, rigid adjustable, double-flexible multi-finger paw, 201310123160.0) discloses a mechanical gripper driven by a cylinder, with the following defects: (1) due to two sliding friction forces generated by by rubber seals on a cylinder piston and a piston rod, the dynamic and static friction coefficients of the mechanical gripper greatly vary with each other, and the sliding friction force is involved with the stress on the piston rod and changes dramatically, so the synchronism control over the cylinder piston movement of the three fingers is complicated, and the position servo control is difficult; (2) the integrated optimal design of the rigidity and stress of the plate spring is not considered, and only single plate springs with uniform sections are employed, wherein the plate springs with uniform sections have poor flexibility; (3) the flexible fingers of the mechanical grippers are vertically installed, apply to the pinching mode of "fingertips touch" only, and cannot employ the envelop grasping mode of "touch of finger segments and palm at several positions", so the application scope is small.

The present invention overcomes the above defects. The mechanical gripper of the present invention has two or three flexible fingers, and the flexible fingers are identical in structure. In principle, a flexible finger framework is a series-connection plate spring flexible framework formed by a thick-plate spring 4, a rigid threaded plate 5 and a thin-plate spring 7. Shapes and dimensions of the thick-plate 4 and the thin-plate spring 7 are designed according to features of specific types of complicated objects. The installation position of the hinge base 9 on the thin-plate spring 7 is adjustable. Thus, a degree of flexible freedom adapted to specific types of complicated objects is generated.

Figure 1:
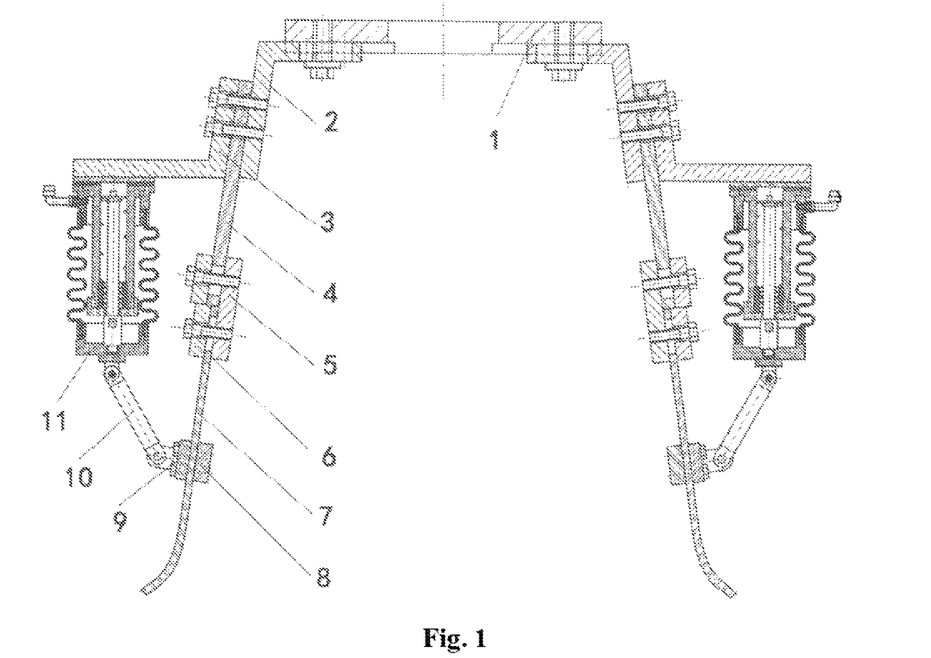
FIG. 1 is a front view of an elastic corrugated pipe single-acting cylinder-driven mechanical gripper with a series-connection plate spring framework.
Figure 2:
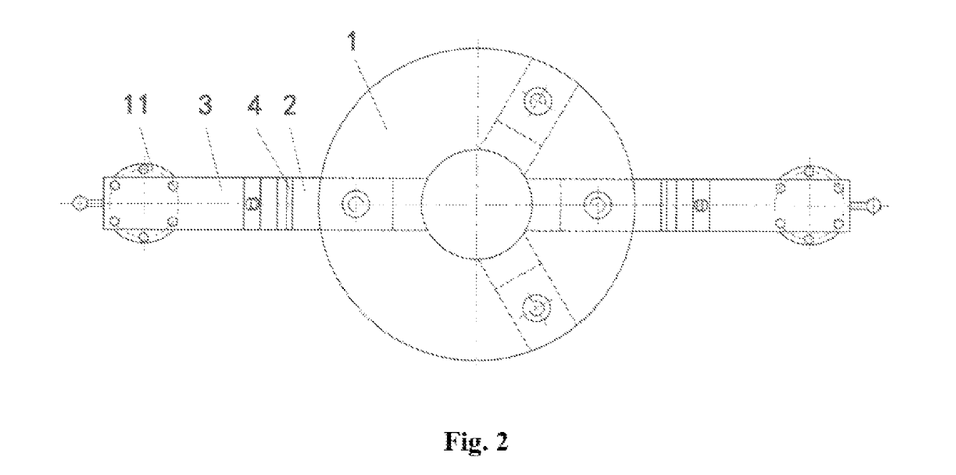
FIG. 2 is a top view of two fingers of the elastic corrugated pipe single-acting cylinder-driven mechanical gripper with a series-connection plate spring framework in installation status.

The solution of the present invention is as follows:

A structure of a mechanical gripper of the present invention can be seen in FIGS. 1 and 2, consisting of two identical flexible fingers and a palm plate 1. The two identical flexible fingers are symmetrically installed in guide slots of the palm plate 1 on the left and right, with a center distance defined by a center hole on the palm plate 1. Each flexible finger consists of a finger root 2, a bendable plate 3, a thick-plate spring 4, a thread plate 5, pressure blocks 6, a thin-plate spring 7, a pressure plate 8, a hinge base 9, two-force bars 10, and an elastic corrugated pipe single-acting cylinder 11. Characteristics of the mechanical gripper of the present invention are as follows. The finger root 2 works as a guide in the guide slots of the palm plate 1. A screw passes through a waist-shaped groove on the finger root 2 to fix the finger root 2 on the palm plate 1. The waist-shaped groove on the finger root 2 can regulate the center distance of the flexible fingers. Through the screw, the thick-plate spring 4 is clamped between the bendable plate 3 and the finger root 2. Two pressure blocks 6 respectively press the thick-plate spring 4 and the thin-plate spring 7 on the thread plate 5. The thick-plate spring 4 and the thin-plate spring 7 have waist-shaped grooves at the parts where they are pressed by the screw plate 5 in order to facilitate regulation on the actual working length of the thick-plate spring 4 and the thin-plate spring 7. The pressure plate 8 has four threaded holes which are inserted by four screws. Four screws penetrate the hinge base 9 to tighten the thin-plate spring 7 on the pressure plate 8. The thin-plate spring 7 has no hole, facilitating the installation position of the hinge base 9 on the thin-plate spring 7. The bottom end of the thin-plate spring 7 is of a curved face. The two ends of the two-force bars 10 are hinges, respectively forming a hinge connection with the hinge base 9 and a hinge support 11a on the elastic corrugated pipe single-acting cylinder 1.

Figure 3:
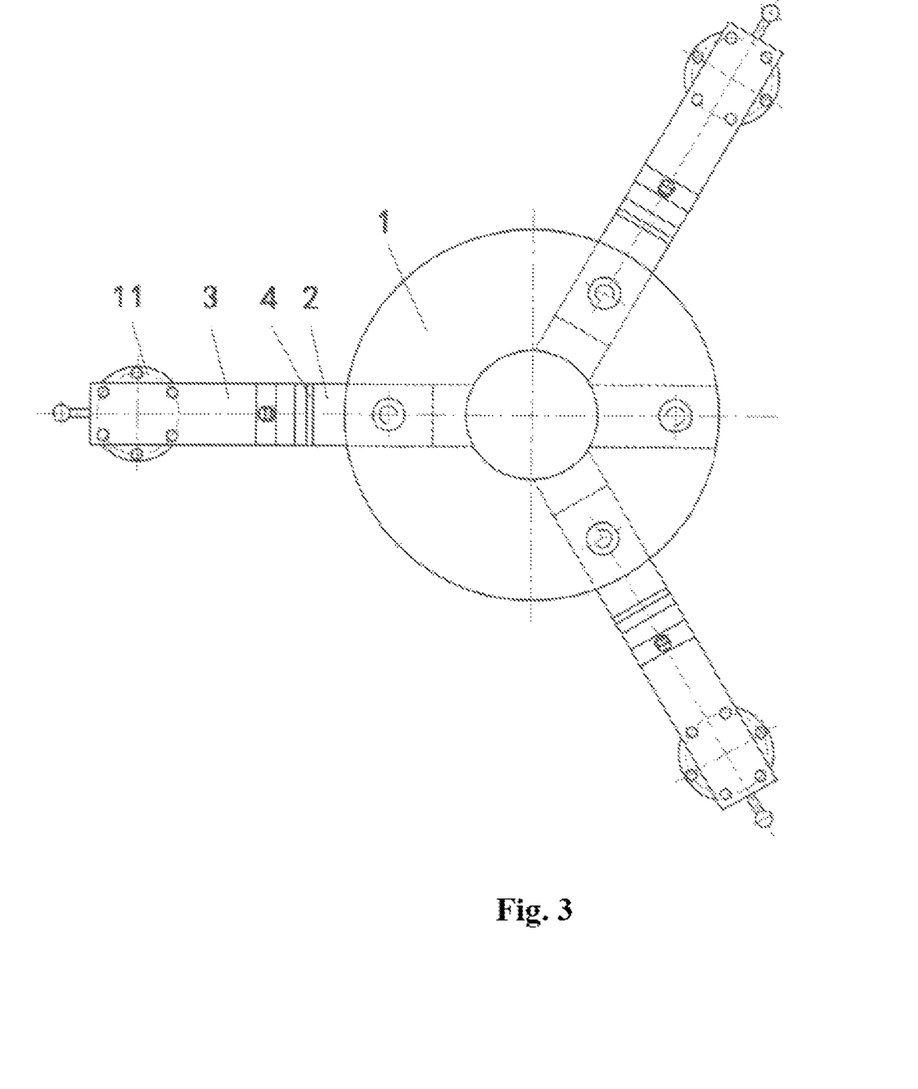
FIG. 3 is a top view of three fingers of the elastic corrugated pipe single-acting cylinder-driven mechanical gripper with a series-connection plate spring framework in installation status.

Another structure of a mechanical gripper of the present invention can be seen in FIG. 3, consisting of three identical flexible fingers and a palm plate 1. The three identical flexible fingers are uniformly installed in guide slots of the palm plate 1 at an interval of 120°, with center distances defined by a center hole on the palm plate 1. The structure of the flexible fingers is identical with the above mentioned structure. Each flexible finger consists of a finger root 2, a bendable plate 3, a thick-plate spring 4, a thread plate 5, pressure blocks 6, a thin-plate spring 7, a pressure plate 8, a hinge base 9, two-force bars 10, and an elastic corrugated pipe single-acting cylinder 11.

Figures 4, 5:
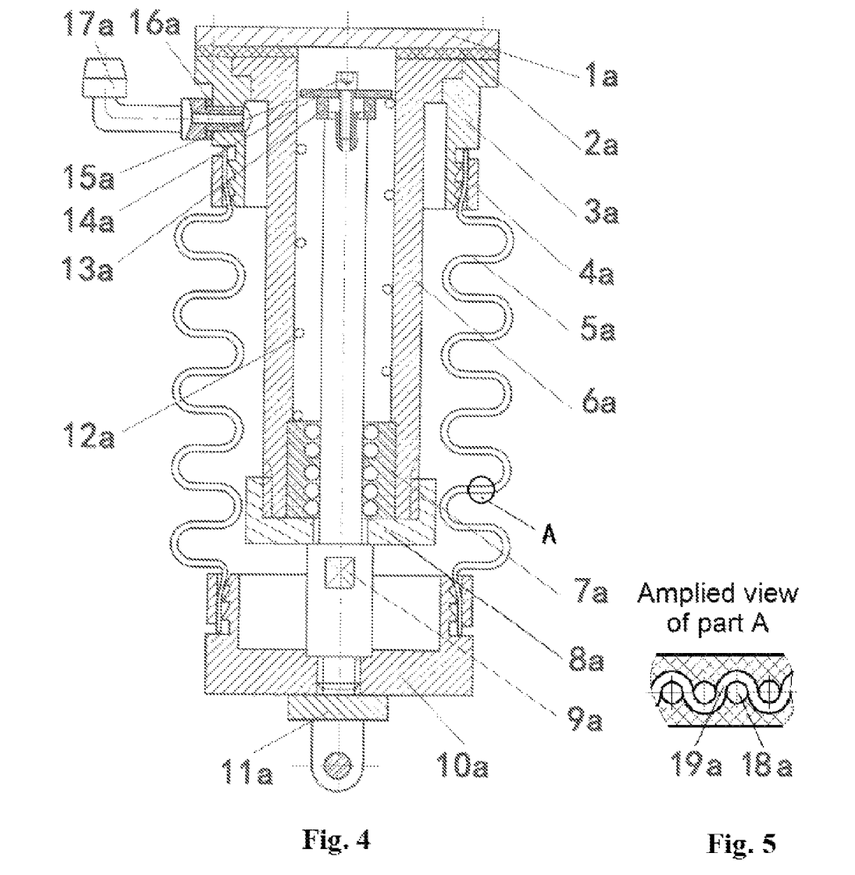
FIG. 4 is a front view of an elastic corrugated pipe single-acting cylinder of the elastic corrugated pipe single-acting cylinder-driven mechanical gripper with a series-connection plate spring framework.
FIG. 5 is a partially enlarged view at part A of the elastic corrugated pipe single-acting cylinder of the elastic corru
Figure 6:
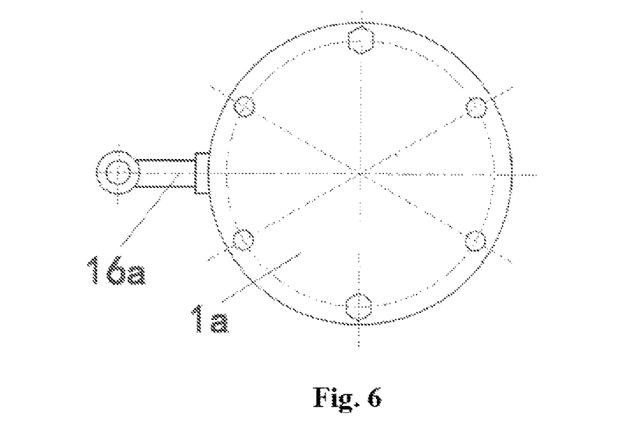
- FIG. 6 is a top view of the elastic corrugated pipe single-acting cylinder of the elastic corrugated pipe single-acting cylinder-driven mechanical gripper with a series-connection plate spring framework.

As shown in FIGS. 4-6, the elastic corrugated pipe single-acting cylinder 11 consists of a bottom cover 1a, a rubber pad 2a, a cylinder base 3a, a hoop 4a, an elastic corrugated pipe 5a, a guide sleeve 6a, a linear bearing 7a, a threaded cover 8a, a guide rod 9a, a guide rod base 10a, a hinge support 11a, a compression spring 12a, a nylon regulating plate 13a, a spring cover 14a, an internal hexagonal screw 15a, a sealing ring 16a, a plug-in coupling 17a, annular weft yarns 18a and warp yarns 19a. The elastic corrugated pipe single-acting cylinder is characterized in that, the bottom cover 1a, the rubber pad 2a and the cylinder base 3a are fixed together through screws. A flange at the upper end of the guide sleeve 6a is pressed by the cylinder base 3a on the rubber pad 2a. A column below the flange of the guide sleeve 6a is in clearance fit with a minimum hole of the cylinder base 3a, ensuring the coaxiality of the guide sleeve 6a and the cylinder base 3a. The rubber elastic corrugated pipe 5a is fixed on the cylinder base 3a and the guide rod base 10a by using the hoop 4a. The linear bearing 7a guiding the guide rod 9a is installed in the guide sleeve 6a. The threaded cover 8a caps the guide sleeve 6a in a screw manner to axially fix the linear bearing 7a. The guide rod 9a is installed on the guide rod base 10a. The compression spring 12a is disposed inside the guide sleeve 6a. The internal hexagonal screw 15a fixes the nylon regulating plate 13a and the spring cover 14a on the guide rod 9a. The spring cover 14a presses the compression spring 12a. Through replacing nylon regulating plates 13a with different thicknesses, the pre-tension of the compression spring 12a, and the journey of the elastic corrugated pipe single-acting cylinder 11 can be regulated. The hinge support 11a is installed at the symmetric center of the guide rod base 10a. Adjusting the phase angle of the elastic corrugated pipe 5a on the guide rod base 10a ensures that the hinge support 11a remains on the same plane together with the hinge base 9 and the two-force bars 10. The plug-in coupling 17a is equipped on the cylinder base 3a in a threaded way. The sealing ring 16a is disposed between screw threads of the plug-in coupling 17a and the cylinder base 3a. For reinforcement, the rubber elastic corrugated pipe 5a is internally provided with annular weft yarns 18a, and warp yarns 19a which are distributed along the axial direction of the elastic corrugated pipe 5a and are winded with the annular weft yarns 18a.

Figure 7:
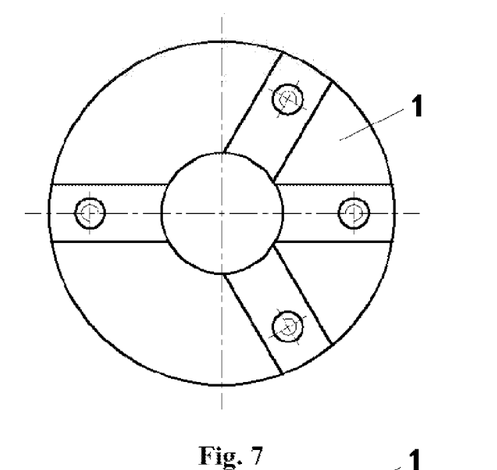
FIG. 7 is a bottom view of a palm plate of the elastic corrugated pipe single-acting cylinder-driven mechanical gripper with a series-connection plate spring framework.
Figure 8:
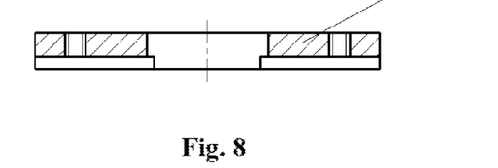
FIG. 8 is a front view of the palm plate of the elastic corrugated pipe single-acting cylinder-driven mechanical gripper with a series-connection plate spring framework.

As shown in FIGS. 7 and 8, the palm plate 1 is provided with four guide slots; left guide slot is symmetrical to the right guide slot; the left guide slot and the two right guide slots on the upper and lower parts are uniformly distributed at an interval of 120°; the four guide slots have four threaded holes, and the four threaded holes are identical in center distance.

Figure 9:
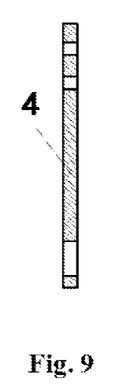
FIG. 9 is a front view of a thick-plate spring of the elastic corrugated pipe single-acting cylinder-driven mechanical gripper with a series-connection plate spring framework.
Figure 10:
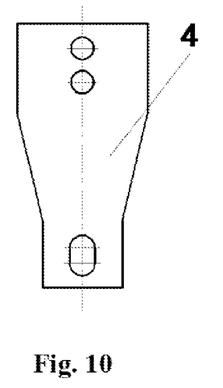
FIG. 10 is a left view of the thick-plate spring of the elastic corrugated pipe single-acting cylinder-driven mechanical gripper with a series-connection plate spring framework.

As shown in FIGS. 9 and 10, the thick-plate spring 4 includes three parts, respectively a cuboid part, a trapezoid part and a cuboid part from the upside down, which means that the middle trapezoid part of the thick-plate spring 4 has a variable width.

Figure 11:
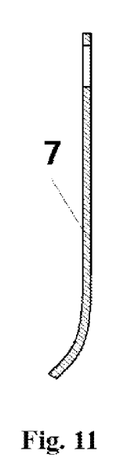
FIG. 11 is a front view of a thin-plate spring of the elastic corrugated pipe single-acting cylinder-driven mechanical gripper with a series-connection plate spring framework.
Figure 12:
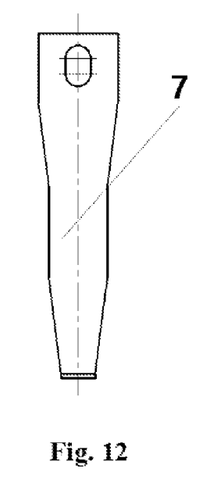
FIG. 12 is a left view of the thin-plate spring of the elastic corrugated pipe single-acting cylinder-driven mechanical gripper with a series-connection plate spring framework.

As shown in FIGS. 11 and 12, the thin-plate spring 7 includes four parts, respectively a cuboid part, a trapezoid part, a cuboid part and a trapezoid part from the upside down, which means that the two trapezoid parts of the thin-plate spring 7 have variable widths, and the lower end of the thin-plate spring 7 is shaped as a curved face.

Compared with the prior art, the present invention has the following advantages:

(1) In an integrated optimal design which takes the rigidity and stress of each plate spring into consideration, two plate springs of different thicknesses and variable widths are connected in series, so the series-connection plate spring framework has high flexibility, the series-connection plate spring framework of the mechanical gripper is installed in an inclined way, so the mechanical gripper applies not only to the pinching mode of "fingertip touch" (applicable to light grasping objects), but also to the envelop gasping mode of "touch of finger segments and palm at several positions" (applicable to heavy and deformable grasping objects), and therefore has a large application scope and high grasping reliability.

(2) The elastic corrugated pipe single-acting cylinder 11 avoids the sliding friction generated by the rubber sealing, and employs the rolling friction guide mode of the linear bearing, so the mechanical gripper has low energy consumption, gives a response quickly and has no low-speed creeping phenomenon; when the mechanical gripper has three fingers, the synchronism control over the cylinder piston movement is relatively simple, and servo control over the finger position and the grasping force are easy.

(3) The rubber corrugated pipe of the elastic corrugated pipe single-acting cylinder 11 only expands axially, is uniformly stressed and has a long service life; the rubber corrugated pipe 5a of the elastic corrugated pipe single-acting cylinder 11 is also sleeved on the guide sleeve 6a and the guide rod 9a even if separated from the hoop 4a, so this structure is safe and reliable; meanwhile, the elastic corrugated pipe single-acting cylinder 11 also has an obvious feature of being light.

DETAILED DESCRIPTION OF PARTICULAR EMBODIMENTS OF THE INVENTION

Below is the working principle and working process of the present invention.

As shown in FIGS. 1-2 and FIGS. 4-6, the working principle of the present invention is as follows:

For long and cuboid complicated objects, after theoretical analysis and experimental study, determination of the safety scope of the grasping force, and optimal design of the structure and dimensions of the mechanical gripper, the shapes and dimensions of the thick-plate spring 4 and the thin-plate spring 7, and the characteristic parameters and pre-tension of the compression spring 12*a* are carried out according to the variable scopes of shape and dimensions of objects to be grasped and material property of objects to be grasped, thus determining the installation position dimensions of the flexible fingers on the palm plate 1 and determining the installation position dimensions of the hinge base 9 on the thin-plate spring 7.

Meanwhile, when the structural dimensions of the mechanical gripper with the series-connection spring plate framework and the elastic parameters of the thick-plate spring 4, the thin-plate spring 7 and the compression spring 12*a* are comprehensively designed upon specific grasping objects, it is needed to ensure that the resultant force and resultant moment generated by three spring forces on the guide rod 9*a* during return do not generate self-locking (in order to prevent self-locking, the linear bearing 7*a* is adopted to increase the pressure angle). Therefore, the guide rod 9*a* of the elastic corrugated pipe single-acting cylinder 11 can return to the original position, and the thick-plate spring 4 and the thin-plate spring 7 of the mechanical gripper return to the initial straight status.

Moreover, the elastic corrugated pipe is initially "U" shaped, and when it is assembled to serve as a part of the elastic corrugated pipe single-acting cylinder 11, the elastic corrugated pipe is initially "Ω" shaped, thus obtaining a relatively larger journey.

As shown in FIGS. 1-2 and FIGS. 4-6, the working process of the present invention is as follows: (1) When the gas pressure in the elastic corrugated pipe single-acting cylinder 11 is the set pressure, the elastic corrugated pipe single-acting cylinder 11 overcomes the elastic forces of the thick-plate spring 4, thin-plate spring 7 and compression spring 12*a* and reaches the scope of the required grasping contact force, and keeps the grasping status; (2) in the grasping status, a degree of flexible freedom is generated due to the synergistic effect of the elastic deformation of the thick-plate spring 4 and the thin-plate spring 7 which are connected in series, so the mechanical gripper has self-adaption to the changes in dimensions and shapes of the grasped objects; (3) when the gas pressure in the elastic corrugated pipe single-acting cylinder 11 is released, the mechanical gripper with the series-connection plate spring framework returns to the initial status by the combined effect of the thick-plate spring 4, the thin-plate spring 7 and the compression spring 12*a* in the elastic corrugated pipe single-acting cylinder 11.

As shown in FIG. 1, FIG. 3 and FIGS. 4-6, for spherical and short cylindrical complicated objects, design and regulation are carried out by the above steps after experimental study and theoretical analysis.

The invention claimed is:

1. An elastic corrugated pipe single-acting cylinder-driven mechanical gripper with a series-connection plate spring framework, wherein a first flexible finger and a second flexible finger that is identical to the first flexible finger are symmetrically installed in guide slots of a palm plate on the left and right, with a center distance defined by a center hole on the palm plate, wherein each of the first and second flexible fingers consists of a finger root, a bendable plate, a thick-plate spring, a thread plate, pressure blocks, a thin-plate spring, a pressure plate, a hinge base, two-force bars, and an elastic corrugated pipe single-acting cylinder; the finger root works as a guide in the guide slots of the palm plate; a first screw passes through a first capsule-shaped groove on the finger root to fix the finger root on the palm plate; the first capsule-shaped groove on the finger root can regulate the center distance of the flexible finger; through a second screw, the thick-plate spring is clamped between the bendable plate and the finger root; two pressure blocks respectively press the thick-plate spring and the thin-plate spring on the thread plate; the thick-plate spring and the thin-plate spring have second capsule-shaped grooves at the parts where they are pressed by the screw plate in order to facilitate regulation on the actual working length of the thick-plate spring and the thin-plate spring; the pressure plate has four threaded holes which are inserted by four third screws; the four third screws penetrate the hinge base to tighten the thin-plate spring on the pressure plate; the thin-plate spring has no hole, facilitating the installation position of the hinge base on the thin-plate spring; and the two ends of the two-force bars are hinges, respectively forming a hinge connection with the hinge base and a hinge support on the elastic corrugated pipe single-acting cylinder;

wherein each of the first and second capsule-shaped grooves has two opposite round ends and two straight sides parallel to each other.

2. The elastic corrugated pipe single-acting cylinder-driven mechanical gripper with a series-connection plate spring framework according to claim 1, wherein the elastic corrugated pipe single-acting cylinder consists of a bottom cover, a rubber pad, a cylinder base, a hoop, a rubber elastic corrugated pipe, a guide sleeve, a linear bearing, a threaded cover, a guide rod, a guide rod base, a hinge support, a compression spring, a nylon regulating plate, a spring cover, an internal hexagonal screw, a sealing ring, a plug-in coupling, annular weft yarns and warp yarns, wherein the bottom cover, the rubber pad and the cylinder base are fixed together through screws; a flange at the upper end of the guide sleeve is pressed by the cylinder base on the rubber pad; a column below the flange of the guide sleeve is in clearance fit with a minimum hole of the cylinder base, ensuring the coaxiality of the guide sleeve and the cylinder base; the rubber elastic corrugated pipe is fixed on the cylinder base and the guide rod base by using the hoop; the linear bearing guiding the guide rod is installed in the guide sleeve; the threaded cover caps the guide sleeve in a screw manner to axially fix the linear bearing; the guide rod is installed on the guide rod base; the compression spring is disposed inside the guide sleeve; the internal hexagonal screw fixes the nylon regulating plate and the spring cover on the guide rod; the spring cover presses the compression spring; through replacing the nylon regulating plate with other nylon regulating plates with different thicknesses, the pre-tension of the compression spring, and the journey of the elastic corrugated pipe single-acting cylinder can be regulated; the hinge support is installed at the symmetric center of the guide rod base; adjusting the phase angle of the elastic corrugated pipe on the guide rod base ensures that the hinge support remains on the same plane together with the hinge base and the two-force bars; the plug-in coupling is equipped on the cylinder base in a threaded way; the sealing ring is disposed between screw threads of the plug-in coupling and the cylinder base; and the rubber elastic corrugated pipe is internally provided with annular weft yarns for reinforcement, and warp yarns which are distributed along the axial direction of the elastic corrugated pipe and are winded with the annular weft yarns.

3. The elastic corrugated pipe single-acting cylinder-driven mechanical gripper with a series-connection plate spring framework according to claim 1, wherein, the palm plate is provided with a left guide slot, a right-upper guide slot, a right-middle guide slot, and a right-lower slot; the left guide slot is symmetrical to the right-middle guide slot; the left guide slot and the right-upper guide slot and the right-lower guide slot are uniformly distributed at an interval of 120°; each of the left guide slot, the right-upper guide slot, the right-middle guide slot, and the right-lower slot has a threaded hole, and the threaded holes of the left guide slot, the right-upper guide slot, the right-middle guide slot, and the right-lower slot are identical in center distance.

4. The elastic corrugated pipe single-acting cylinder-driven mechanical gripper with a series-connection plate spring framework according to claim 1, wherein, the thick-plate spring includes a first cuboid part, a trapezoid part and a second cuboid part in sequence from top to bottom the trapezoid part of the thick-plate spring has a variable width.

5. The elastic corrugated pipe single-acting cylinder-driven mechanical gripper with a series-connection plate spring framework according to claim 1, wherein, the thin-plate spring includes a first cuboid part, a first trapezoid part, a second cuboid part and a second trapezoid part in sequence from too to bottom each of the first and second trapezoid parts has a variable width; and the lower end of the thin-plate spring is shaped as a curved face.

6. An elastic corrugated pipe single-acting cylinder-driven mechanical gripper with a series-connection plate spring framework, wherein a first flexible finger, a second flexible finger that is identical to the first flexible finger, and a third flexible finger that is identical to the first flexible finger, the first, second, and third flexible fingers are uniformly installed in guide slots of a palm plate at an interval of 120°, with center distances defined by a center hole on the palm plate;

wherein each of the first, second, and third flexible fingers consists of a finger root, a bendable plate, a thick-plate spring, a thread plate, pressure blocks, a thin-plate spring, a pressure plate, a hinge base, two-force bars, and an elastic corrugated pipe single-acting cylinder; the finger root works as a guide in the guide slots of the palm plate; a first screw passes through a first capsule-shaped groove on the finger root to fix the finger root on the palm plate; the first capsule-shaped groove on the finger root can regulate the center distance of the flexible finger; through a second screw, the thick-plate spring is clamped between the bendable plate and the finger root; two pressure blocks respectively press the thick-plate spring and the thin-plate spring on the thread plate; the thick-plate spring and the thin-plate spring have second capsule-shaped grooves at the parts where they are pressed by the screw plate in order to facilitate regulation on the actual working length of the thick-plate spring and the thin-plate spring; the pressure plate has four threaded holes which are inserted by four third screws; the four third screws penetrate the hinge base to tighten the thin-plate spring on the pressure plate; the thin-plate spring has no hole, facilitating the installation position of the hinge base on the thin-plate spring; and the two ends of the two-force bars are hinges, respectively forming a hinge connection with the hinge base and a hinge support on the elastic corrugated pipe single-acting cylinder;

wherein each of the first and second capsule-shaped grooves has two opposite round ends and two straight sides parallel to each other.

7. The elastic corrugated pipe single-acting cylinder-driven mechanical gripper with a series-connection plate spring framework according to claim 6, wherein the elastic corrugated pipe single-acting cylinder consists of a bottom cover, a rubber pad, a cylinder base, a hoop, a rubber elastic corrugated pipe, a guide sleeve, a linear bearing, a threaded cover, a guide rod, a guide rod base, a hinge support, a compression spring, a nylon regulating plate, a spring cover, an internal hexagonal screw, a sealing ring, a plug-in coupling, annular weft yarns and warp yarns, wherein the bottom cover, the rubber pad and the cylinder base are fixed together through screws; a flange at the upper end of the guide sleeve is pressed by the cylinder base on the rubber pad; a column below the flange of the guide sleeve is in clearance fit with a minimum hole of the cylinder base, ensuring the coaxiality of the guide sleeve and the cylinder base; the rubber elastic corrugated pipe is fixed on the cylinder base and the guide rod base by using the hoop; the linear bearing guiding the guide rod is installed in the guide sleeve; the threaded cover caps the guide sleeve in a screw manner to axially fix the linear bearing; the guide rod is installed on the guide rod base; the compression spring is disposed inside the guide sleeve; the internal hexagonal screw fixes the nylon regulating plate and the spring cover on the guide rod; the spring cover presses the compression spring; through replacing the nylon regulating plate with other nylon regulating plates with different thicknesses, the pre-tension of the compression spring, and the journey of the elastic corrugated pipe single-acting cylinder can be regulated; the hinge support is installed at the symmetric center of the guide rod base; adjusting the phase angle of the elastic corrugated pipe on the guide rod base ensures that the hinge support remains on the same plane together with the hinge base and the two-force bars; the plug-in coupling is equipped on the cylinder base in a threaded way; the sealing ring is disposed between screw threads of the plug-in coupling and the cylinder base; and the rubber elastic corrugated pipe is internally provided with annular weft yarns for reinforcement, and warp yarns which are distributed along the axial direction of the elastic corrugated pipe and are winded with the annular weft yarns.

8. The elastic corrugated pipe single-acting cylinder-driven mechanical gripper with a series-connection plate spring framework according to claim 6, wherein the palm plate is provided with a left guide slot, a right-upper guide slot, a right-middle guide slot, and a right-lower slot; the left guide slot is symmetrical to the right-middle guide slot; the left guide slot and the right-upper guide slot and the right-lower guide slot are uniformly distributed at an interval of 120°; each of the left guide slot, the right-upper guide slot, the right-middle guide slot, and the right-lower slot has a threaded hole, and the threaded holes of the left guide slot, the right-upper guide slot, the right-middle guide slot, and the right-lower slot are identical in center distance.

9. The elastic corrugated pipe single-acting cylinder-driven mechanical gripper with a series-connection plate spring framework according to claim 6, wherein, the thick-plate spring includes a first cuboid part, a trapezoid part and a second cuboid part in sequence from top to bottom, the trapezoid part of the thick-plate spring has a variable width.

10. The elastic corrugated pipe single-acting cylinder-driven mechanical gripper with a series-connection plate spring framework according to claim 6, wherein, the thin-plate spring includes a first cuboid part, a first trapezoid part, a second cuboid part and a second trapezoid part in sequence from top to bottom, each of the first and second trapezoid parts has a variable width; and the lower end of the thin-plate spring is shaped as a curved face.

* * * * *